United States Patent [19]

Nhu

[11] Patent Number: 5,237,441
[45] Date of Patent: Aug. 17, 1993

[54] MICROPROCESSOR CHIP INCORPORATING OPTICAL SIGNAL COUPLING TRANSCEIVER

[75] Inventor: David H. C. Nhu, North Potomac, Md.

[73] Assignee: The United States of America as represented by the Secretary of the Navy, Washington, D.C.

[21] Appl. No.: 483,686

[22] Filed: Feb. 23, 1990

[51] Int. Cl.[5] .............................................. H04B 10/00
[52] U.S. Cl. ................................... 359/152; 359/163; 359/184; 307/358
[58] Field of Search ............... 359/163, 184, 185, 186, 359/152, 162, 113, 164, 188, 195; 307/358

[56] References Cited

U.S. PATENT DOCUMENTS

| | | | |
|---|---|---|---|
| 3,986,016 | 10/1976 | Linn et al. | 235/156 |
| 4,682,323 | 7/1987 | Corfield et al. | 359/139 |
| 4,683,550 | 7/1987 | Jindrick et al. | 364/900 |
| 4,705,960 | 11/1987 | Lovrenich | 359/173 |
| 4,829,596 | 5/1989 | Barina | 359/124 |
| 4,850,044 | 7/1989 | Block et al. | 359/163 |
| 4,866,704 | 9/1989 | Bergman | 359/165 |
| 4,908,823 | 3/1990 | Haagens | 455/606 |
| 4,989,219 | 1/1991 | Gerdes | 375/52 |

FOREIGN PATENT DOCUMENTS 0185131 7/1988 Japan ................................... 359/163

OTHER PUBLICATIONS

Bar Chaim, "Integrated Optoelectronics" IEEE Spectrum May 1982 pp. 38–46.

Primary Examiner—Richard E. Chilcot, Jr.
Assistant Examiner—Kinfe-Michael Negash
Attorney, Agent, or Firm—John D. Lewis; Jacob Shuster

[57] ABSTRACT

Microprocessor and transceiver circuitry are incorporated into a single chip for enhanced, high speed operation of an electronic circuit board by use of optical fiber connections between two or more of such single chips and external peripherals. The transceiver circuitry includes transmitter and receiver sections through which the optical signals are respectively generated and received by a light emitting diode and a photo-diode.

5 Claims, 2 Drawing Sheets

MICROPROCESSOR CHIP INCORPORATING OPTICAL SIGNAL COUPLING TRANSCEIVER

BACKGROUND OF THE INVENTION

The invention relates to improvements in microprocessor chips for enhancing the construction and operation of computer equipment.

Microprocessor chips as presently constructed have various operational performance limits in the handling of different types of logic data. When such limits are exceeded, problems occur such as overshoot, poor signal quality, electromagnetic interference, reflections, crosstalk noise, etc. With respect to CMOS logic, for example, the clock rates are relatively slow as compared to those available for ECL logic circuitry. However, ECL logic circuitry have a lower circuit density and a higher cost factor. Accordingly, new and more expensive packaging would be required for high speed circuit boards utilizing microprocessor chips embodying ECL logic circuitry for high speed performance. Also facilities for handling correspondingly high power levels are required for such high speed performance as compared to lower power levels for the lower clock rates associated with CMOS logic circuitry.

It is therefore an important object of the present invention to provide an improved high speed microprocessor chip embodying CMOS, ECL or BiCMOS logic circuitry which will provide cost and performance gains for each of the different types of logic circuitry as well as to provide greater peripheral computer integration than was heretofore deemed possible.

SUMMARY OF THE INVENTION

In accordance with the present invention, each microprocessor chip utilized on a circuit board as a data processing module has incorporated therein a transceiver through which optical signals are either generated or received in order to transmit data to or from the microprocessor circuitry in a binary logic format. The optical signals are generated by the transmitter section of the transceiver through a light emitting diode driven by amplified binary logic inputs from the microprocessor circuitry at a high speed controlled by its clock. Such optical signals are conducted by a fiber optic connector arrangement to external peripherals and to the receiver section of the transceiver in another microprocessor chip on the circuit board. The receiver section includes a photo-diode through which the optical signals are converted into electrical pulses which are then suitably processed and converted into binary logic data fed to the microprocessor circuitry. Processing of the electrical pulses involves conversion into analog signals and detection of peak signal intensity of the pulses, before such conversion, to limit digital binary outputs from a converter to which the analog signals are fed after being quantisized with respect to midpoint levels thereof.

BRIEF DESCRIPTION OF THE DRAWINGS

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
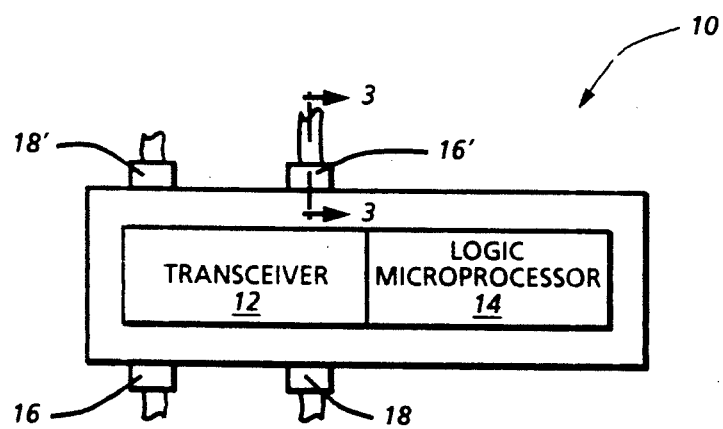
FIG. 1 is a simplified top plan view of a single microprocessor chip constructed in accordance with the present invention.

Referring now to the drawing, FIG. 1 shows a single microprocessor chip type of module generally referred to by reference numeral 10. The chip 10 incorporates a transceiver 12 and a logic microprocessor 14 operatively coupled to each other. Two pair of data terminals are associated with the transceiver 12 in the illustrated embodiment, consisting of data input terminal 16 and data output terminal 18 adjacent thereto, and an opposite pair of adjacent input and output terminals 16' and 18'.

Figure 3:
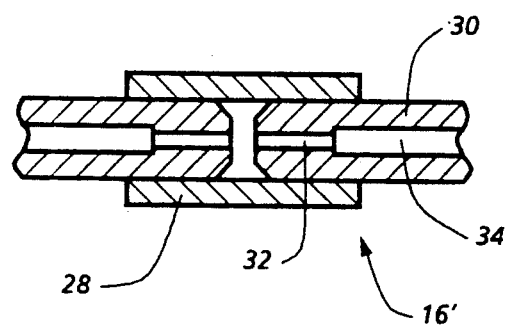
FIG. 3 is an enlarged partial section view of an optical fiber connection taken substantially through a plane indicated by section line 3—3 in FIG. 1.
Figure 4:
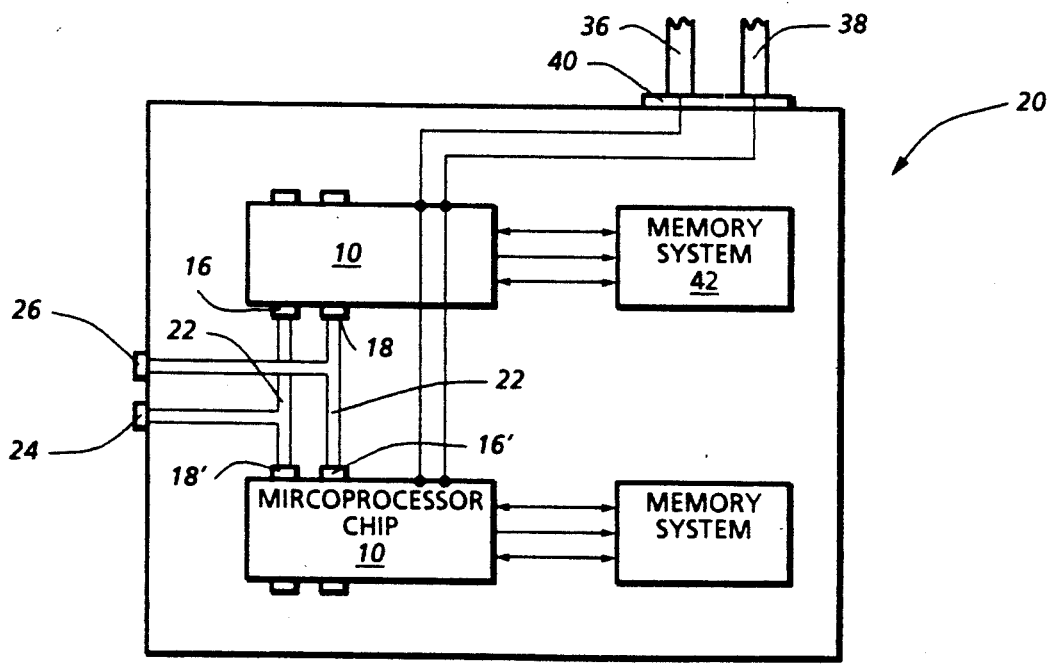
FIG. 4 is a simplified top plan view of an electric circuit board arrangement incorporating two of the microprocessor chips depicted in FIGS. 1 and 2.
Figure 2:
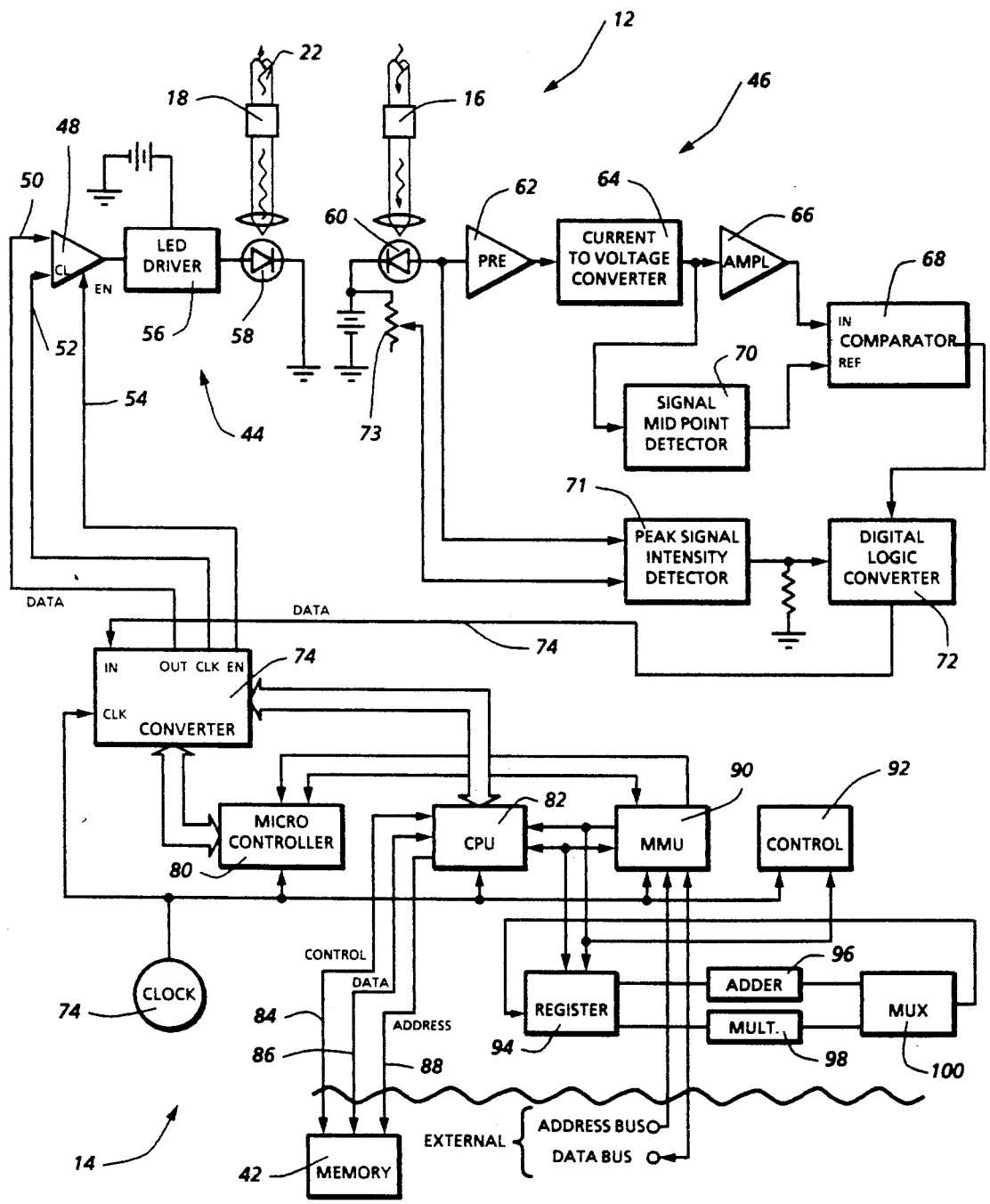
FIG. 2 is a circuit diagram corresponding to the microprocessor chip depicted in FIG. 1.

In accordance with one embodiment of the invention, two microprocessor chips 10 are mounted on a common electronic circuit board 20 as shown in FIG. 4. The chips 10 are interconnected through their terminal pairs 16-18' and 18-16' by optical fiber connectors 22 to which external connector terminals 24 and 26 are coupled. Each of the terminals 16, 16', 18, 18', 24 and 26 may be of similar construction, as shown by way of example in FIG. 3, including a coupling sleeve 28 fastened to one end of a ferrule 30 through which an uncoated optical fiber portion 32 extends from a coated fiber 34. The fiber portion 32 is exposed internally of the sleeve for optical coupling to the exposed fiber portion of another coated fiber as shown. External peripherals may be coupled to the circuit board 20 by means of such optical connections at the terminals 24 and 26 while external data and address busses 36 and 38 are coupled to the board 20 through a connector 40 as shown in FIG. 2 for transmission of logic data to and from the chips 10. The circuit board 20 may also mount computer components forming memory systems 42, as diagrammed in FIG. 4, to which the chips 10 are electrically coupled.

FIG. 2 is a simplified circuit diagram corresponding to a single microprocessor chip 10 within which the transceiver 12 embodies a transmitter section 44 and a receiver section 46. The transmitter section 44 includes an amplifier 48 having a data input 50, a clock input 52 and an enable input 54. The amplified output of amplifier 48 is fed to a light emitting diode (LED) driver 56 to which a light-emitting diode 58 is coupled for transforming binary logic input data supplied to input 50 into optical signals conducted through one of the fiber connectors 22 extending for example from output terminal 18 of the chip 10. The receiver section 46, on the other hand, includes a photo-diode 60 receiving optical signals through terminal 16 as diagrammed in FIG. 2. The photo-diode 60 converts the optical signals into electrical current pulses fed to a preamplifier 62 for signal processing.

Signal processing within the receiver section 46 is performed by a current-to-voltage converter 64 through which the current pulses from preamplifier 62 are converted into an analog voltage output fed to amplifier 66 for quantizing the input data derived from terminal 16. The analog voltage output of the converter 64 is accordingly fed to the data input of a comparator 68 having a reference input to which a detector 70 supplies a reference signal corresponding to the signal midpoint of the input data. The quantized analog output of comparator 68 is fed to a buffer in the form of a digital logic converter 72 through which the quantized output of comparator 68 is converted to a binary logic output fed through output data line 74 to a converter section 76 of the microprocessor 14. A peak signal intensity detector 71 measures the intensity of the optical signals received at the photo-diode 60 and compares it to the voltage level set through adjustable resistor 73 corresponding to a known power level. The output of detector 71 limits operation of converter 72 to reception of optical signals above a minimum power level and thereby avoids false triggering.

The logic data handled by the microprocessor 14 may be of the CMOS, ECL or BiCMOS type while its architecture may correspond, by way of example, to the arrangement diagrammed in FIG. 2. High speed operation of the converter section 76 is regulated by a processor clock 78 to convert input/output data between parallel and series formats while the converter is interfaced with a microcontroller 80 and a computer processing unit (CPU) 82 executing single-cycle instructions. The CPU 82 is coupled to the memory system 42 aforementioned through control, data and address lines 84, 86 and 88. High speed operation of the microcontroller and CPU are also regulated in synchronism with converter 76 through clock 78 to control the supply of data through line 74 and input 50 to the amplifier 48 of the transmitter section 44 as well as to supply clock signals and enable logic thereto through lines 52 and 54. To protect the main files in the memory systems 42, the microcontroller 80 and CPU 82 are interfaced with a memory management unit (MMU) 90 coupled to a control section 92 for separation of input, address and instruction data. Clock signals are also fed to the control section 92 in parallel with MMU 90 from clock 78.

The microprocessor arrangement as diagrammed in FIG. 2 also includes register section 94 with floating point load control. The register section 94 is accordingly interfaced with the CPU 82, the MMU 90 and the control section 92. Outputs from the register 94 are fed through adder 96 and multiplier 98 to multiplexer 100 from which an output is obtained and applied to the register 94.

Numerous other modifications and variations of the present invention are possible in light of the foregoing teachings. It is therefore to be understood that within the scope of the appended claims the invention may be practiced otherwise than as specifically described.

I claim:

1. In combination with computer equipment having a microprocessor chip, optical fiber means for conducting optical signals and transceiver means incorporated in said microprocessor chip, said transceiver means including receiver means for converting said optical signals from the optical fiber means into electrical pulses and a transmitter section having data transforming means coupled to the optical fiber means for converting binary digital data into the optical signals conducted by the optical fiber means and clock-controlled input means coupled to the data transforming means for amplification of the binary digital data fed thereto from the receiver means.

2. The combination as defined in claim 1 wherein the transceiver means further includes converter means coupled to the receiver means for converting the electrical pulses into analog signals, comparator means operatively connected to the converter means for quantizing the analog signals at midpoint levels thereof by comparison with reference signals, means coupled to the comparator means for conversion of said quantized analog signals into said binary digital data and means responsive to detection of peak signal intensity of the optical signals received by the receiver means for enabling said conversion of the quantized analog signals to correspondingly limit the binary digital data.

3. The combination of claim 1 wherein the computer equipment includes memory system components coupled to said microprocessor chip and mounted in common therewith on an electronic circuit board.

4. The combination of claim 1 wherein said data transforming means comprises a driver operatively connected to the clock-controlled input means and a light emitting diode coupling the driver to the optical fiber means.

5. In combination with a data processor, a transceiver including a transmitter section having means for transforming data into optical signals, optical fiber means for conducting said optical signals and a receiver section converting the optical signals received from the optical fiber means into corresponding electrical pulses, signal processing means transforming the electrical pulses into logic data fed to the data processor, comprising: converter means coupled to the receiver section for converting the electrical pulses into analog signals, comparator means operatively connected to the converter means for quantizing the analog signals at midpoint levels thereof by comparison with reference signals, means coupled to the converter means for conversion of said quantized analog signals into digital outputs as the logic data fed to the data processor and means responsive to detection of peak signal intensity of the optical signals received by the receiver section for enabling said conversion of the quantized analog signals to correspondingly limit the digital outputs.

* * * * *